United States Patent [19]
Wugofski

[11] Patent Number: 5,689,286
[45] Date of Patent: Nov. 18, 1997

[54] COMPONENT-BASED ICON CONSTRUCTION AND CUSTOMIZATION SYSTEM

[75] Inventor: Theodore D. Wugofski, Fort Worth, Tex.

[73] Assignee: AST Research, Inc., Irvine, Calif.

[21] Appl. No.: 673,009

[22] Filed: Jul. 1, 1996

Related U.S. Application Data

[62] Division of Ser. No. 449,893, May 23, 1995, Pat. No. 5,559,947.

[51] Int. Cl.$^6$ .................................... G06F 3/14
[52] U.S. Cl. .................. 345/348; 345/326; 345/340
[58] Field of Search ............................. 395/326, 333, 395/334, 340, 348, 349

[56] References Cited

U.S. PATENT DOCUMENTS

| | | | |
|---|---|---|---|
| 4,731,743 | 3/1988 | Blancato | 395/135 |
| 4,813,013 | 3/1989 | Dunn | 345/117 |
| 4,823,285 | 4/1989 | Blancato | 395/135 |
| 4,984,152 | 1/1991 | Muller | 345/157 |
| 5,041,992 | 8/1991 | Cunningham et al. | 395/135 |
| 5,060,171 | 10/1991 | Steir et al. | 395/135 |
| 5,111,409 | 5/1992 | Gasper et al. | 395/807 |
| 5,249,263 | 9/1993 | Yanker | 395/131 |
| 5,394,522 | 2/1995 | Sanchez-Frank et al. | 395/349 |

OTHER PUBLICATIONS

Microsoft Mail for Windows Version 3.0b, 1992 (attachment of screen display, pp. 1–10).

Mastering Windows 3.1 Special Edition, 1993, pp. 8, 153.

*Primary Examiner*—Phu K. Nguyen
*Assistant Examiner*—Cliff N. Vo
*Attorney, Agent, or Firm*—Haynes and Boone, L.L.P.

[57] ABSTRACT

System and method for constructing and customizing icons for use in a graphical user interface (GUI) is disclosed. A GUI is provided with a set of available user interface components that may be selected and combined by a user to create new icons or to modify existing icons. Each icon comprises a plurality of components and each component may be represented by a set of primitives, or component objects. With respect to each component, a user may select an object from the set of objects to represent the component and the selected objects are combined to create a coherent icon used for representing applications, functions and documents in an operating system or applications program. The combination of the component objects is performed based on sets of rules associated with the individual components, which rules dictate the positioning, scaling, graphical combination and available coloring of the component. In this manner, the creation and modification of icons is accomplished by manipulating objects, rather than bits.

28 Claims, 7 Drawing Sheets

COMPONENT-BASED ICON CONSTRUCTION AND CUSTOMIZATION SYSTEM

This is a divisional of application Ser. No. 08/449,893 filed on May 23, 1995, now U.S. Pat. No. 5,559,947.

TECHNICAL FIELD

The invention relates generally to computer graphical user interfaces (GUIs) and, more particularly, to an object-oriented system for constructing and customizing icons for use in such GUIs.

BACKGROUND OF THE INVENTION

Conventional graphical user interfaces (GUIs), such as Microsoft Windows, make extensive use of graphic elements, or icons, to represent computer applications, functions and documents. These icons may be directly manipulated by a user, using a mouse or other such pointing device, to perform useful tasks. For example, an document icon may be "dragged" to and "dropped" on a printer icon to cause a document represented by the document icon to be printed on a printer represented by the printer icon.

Existing GUIs employ bit-oriented methods to enable a user to create new icons or to modify existing icons in which a pointing device is used to manipulate individual bits of a graphic pad area of a GUI window. Many GUIs provide enhancements to the basic bit-manipulation technique in the form of predefined drawing elements, or "tools", such as circles and rectangles, and various coloring methods, such as color fills, gradient fills and textures. To create or modify an icon, a user selects a tool from a "tool palette" contained within the window and selects a color to be associated with the selected tool from a "color palette" contained within the window, and then "paints" an icon on the the graphic pad area in a bit-oriented fashion. The completed icon is stored as a bit-mapped image in the computer's memory.

Such bit-oriented icon construction and modification methods enable a user to create detailed and unique icons, because each bit in the graphic pad area is independently manipulable. Furthermore, there are no rules governing how the icon must be constructed, so that any uniformity among various icons is a function of the discipline of the user and the few constraints on the GUI program. These advantages quickly become disadvantages, however, in situations in which the user is not a skilled graphic designer, rapid development of an icon is desirable, or icon uniformity is necessary.

One solution to the above problems involves importing preexisting icons, which may be constructed through cut-and-paste or file import operations, and overlaying icon elements using a GUI construction program. This is a complicated process which requires an appreciable amount of user expertise and significant computer system overhead.

Another solution involves permitting the user to select icons from a predefined library of icons and to modify icons by manipulating a selected icon in some limited drawing-type application. While this requires virtually no expertise or artistic ability on the part of the user, the number of icons that may be "created" is restricted by the constraints of the library. Furthermore, a substantial amount of storage is required to maintain an icon library large enough to give the user an acceptable number and variety of icons from which to choose.

Therefore, what is needed is a icon construction and customization system that is easy to use, provides uniformity across designer skill levels and enables rapid generation of icons, but that does not require the user to possess a particular level of artistic skill or design expertise or restrict a user to a predefined library of icons.

SUMMARY OF THE INVENTION

The foregoing problems are solved and a technical advance is achieved by method and apparatus for a component-based icon construction and customization system for use in a GUI. In a departure from the art, the system of the present invention is object-oriented, rather than bit-oriented, so that a user can easily modify or create an icon by manipulating sets of objects associated with individual components of the icon.

In a preferred embodiment, the system of the present invention includes a GUI window having a graphic pad area in which an icon comprising a plurality of components may be created or modified, and a number of control buttons, each of which corresponds to a particular icon component. At any given time, the appearance of an icon component, and thus the appearance of the icon, will be defined by a selected one of a set of "objects" associated with the component. For example, assuming the selected icon is an image of a human face, one component might be "hair," and each object in the set associated with the component might represent a different hair style.

Each object is stored as an individual file in a memory of the computer and the individual files corresponding to the set of objects associated with a particular component are sequentially indexed into a file set. To view the various options available with respect to the appearance of a particular component, and thereby modify the appearance of the icon, the user uses a pointing device, such as a mouse, to select the control button associated with the component to be modified. When the corresponding button is selected, the graphical image of the currently indexed object is removed from the graphic pad area, an index to the object set is incremented, and the graphical image of the newly indexed object is loaded from its file and overlayed on the icon according to rules associated with the component, which relate to the positioning, scaling and coloring of the component. Because the system is object-oriented, the graphical image of the currently indexed object will automatically "appear" in the graphics pad area in the correct location and size relative to the other icon components. In the above-described manner, the user may "scroll" through the objects available for modifying a particular component of the icon simply by selecting the appropriate control button.

Once the user is satisfied with the appearance of the icon, the user may accept the icon by selecting an "OK" control button provided within the window. The accepted icon is then stored for future use, either as a new icon object (i.e., a new bit map or primitive icon) or as a combination of the current object indices. In a preferred embodiment, the former storage method is utilized, so that the icons may be manipulated by other applications, and storage of the icon is based on the identification of the selected objects, so that a primitive icon simply references the appropriate object files. However, the latter storage method results in a significant reduction in storage requirements.

In alternative embodiments, pull-down-menus, rather than control buttons, may be used for selecting objects or "drag-and-drop" operations may be used to pull selected objects to the graphic pad area and overlay them on the icon according to rules associated with the represented component.

In one aspect of the invention, icons created or modified in accordance with the present invention may be used to identify users in a multiple-user computer environment. For example, instead being required to "sign-on" by typing his or her name, a user would simply select his or her personal identification icon from a set of icons displayed in a dialog box, wherein each displayed icon represents a different user of the computer system. The same personal identification icon may also be displayed on active GUI windows throughout the time a user is signed-on to the computer system to identify the current user to other system users.

A technical advantage achieved with the invention is that a user is not restricted to selecting an icon from a predefined library of icons in order to create a new icon or to change an existing icon.

Another technical advantage achieved with the invention is that a user is not required to possess any level of artistic skill or design expertise in order to create new or modify existing icons.

Another technical advantage achieved with the invention is that it enables icons to be generated more rapidly than many bit-oriented methods of creating and modifying icons.

Another technical advantage achieved with the invention is that it enables users to construct icons which resemble themselves, which icons may be used for sign-on and identification purposes in multiple-user computer environments.

DESCRIPTION OF THE PREFERRED EMBODIMENT

Figure 1:
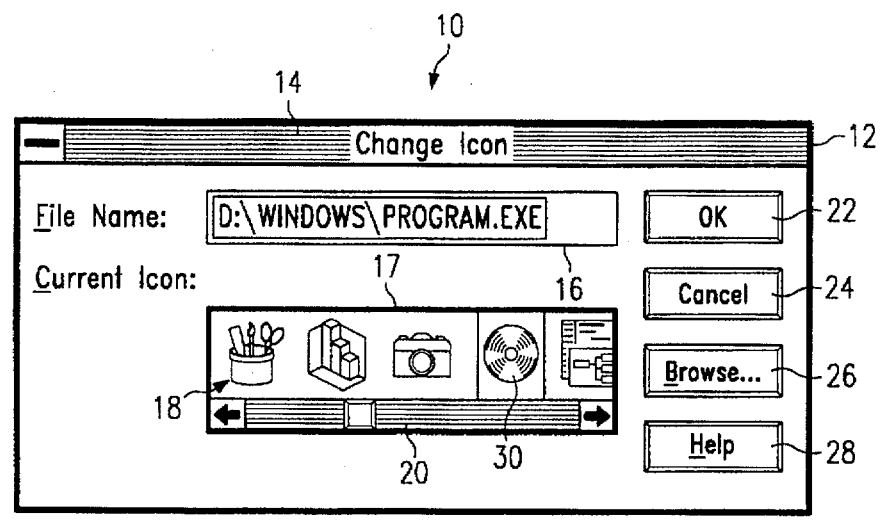
FIG. 1 is a pictorial view of a prior art window for creating an icon.

Referring to FIG. 1, a window of a prior art icon creation and modification system, in which a user selects an icon from a predefined library of icons, is designated generally by the reference numeral 10. The window 10 includes a border, or frame, 12 that bounds the window 10. Within the border 12 are a title bar 14, a field 16 containing the file name of the icon being modified, a field 17 containing a collection of selectable icons 18, a scroll bar 20 for enabling a user to scroll through the icons 18, an "OK" button 22 for accepting a selection, a "CANCEL" button 24 for canceling a selection, a "BROWSE" button 26 for browsing through other collections of icons and a "HELP" button 28 for causing help information to be displayed. In the illustrated embodiment, an icon 30 is selected.

While the window 10 is active, a user may select an icon, such as the icon 30, from the collection of icons 18 that are currently displayed or may view other collections of icons within the icon library (not shown) by using a pointing device, such as a mouse or cursor keys, to select the BROWSE button 26. The use of a pointing device to "select" a window element, such as an icon or control button, is well known in the art and will not be further described herein. Once an acceptable icon is displayed within the field 17, the user may select the icon using the pointing device and then confirm the selection by selecting the OK button 22.

Figure 2:
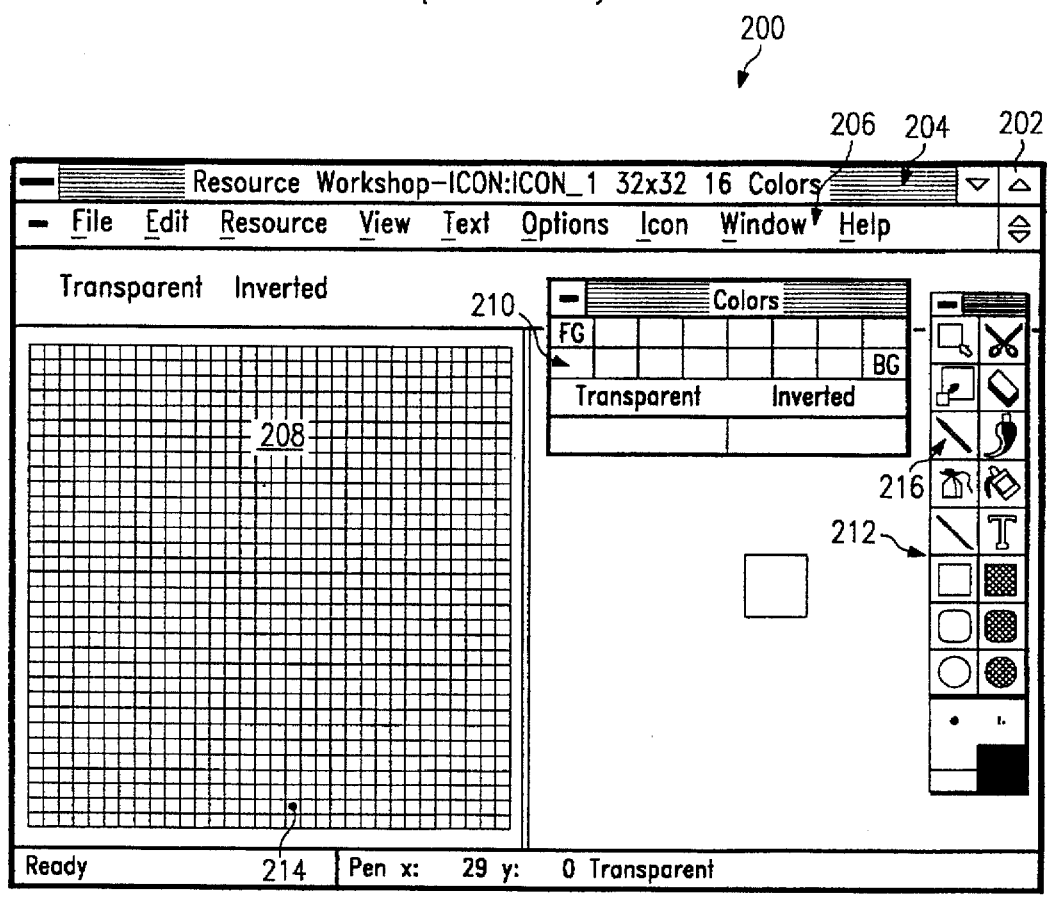
FIG. 2 is a pictorial view of a prior art window for modifying an icon.

Referring to FIG. 2, a window of a prior art system for creating a new icon or modifying an existing icon is designated generally by the reference numeral 200. The window 200 includes a frame 202 that bounds the window 200. Within the frame 202 are a title bar 204, a menu bar 206, a graphic pad area 208, a color palette 210 and a tool palette 212.

The user may modify bits, or pixels, such as a bit 214, of the graphic pad area 208 using functions represented by a tool icon selected from the palette 212. For example, to modify the bit 214 the user selects a tool icon, such as the pen icon 216, from the palette 212 and a color to be associated with the pen from the color palette 210, and then selects a bit, such as the bit 214, of the graphic pad area 208. To change the color associated with the selected tool, and thereby change the color of subsequently selected bits, the user simply selects a new color from the palette 210. Once the user has finished "painting" the graphic pad area 208 in the above manner, the user may save the resultant image for use as an icon by the selecting the appropriate function (not shown) from the menu bar 206.

Figure 3:
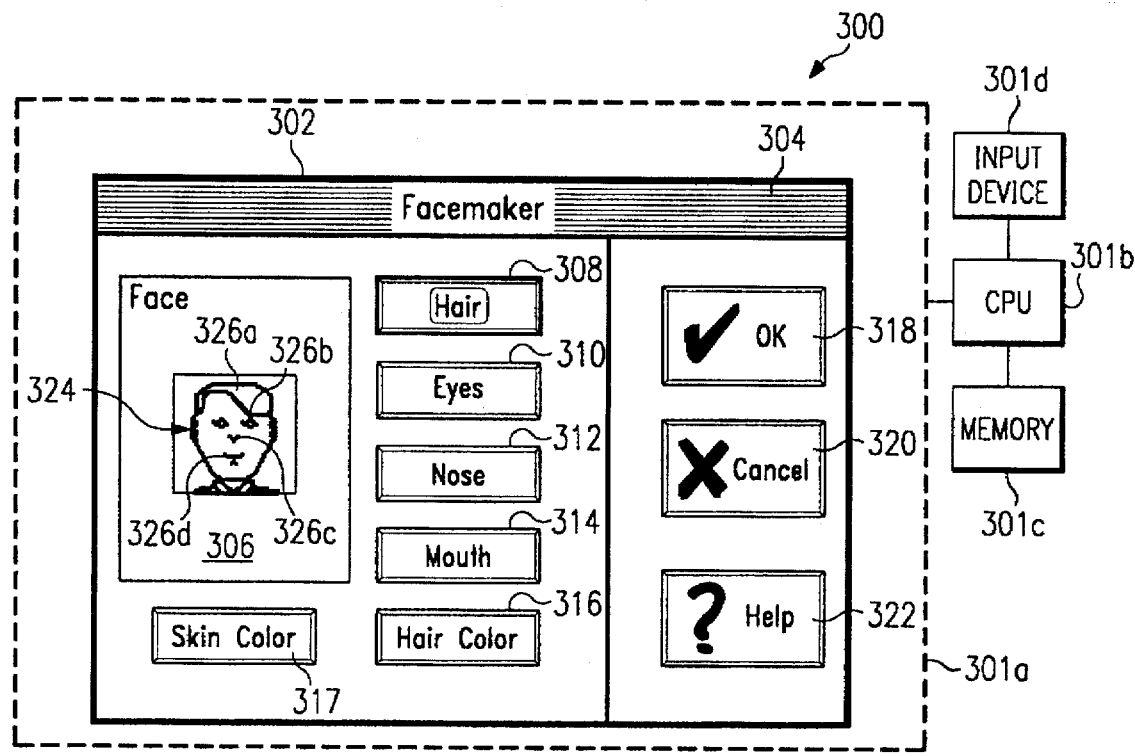
FIG. 3 is a pictorial view of a window of a component-based icon construction and customization system embodying features of the present invention.

Referring to FIG. 3, a window of an icon customization and construction system embodying features of the present invention is designated generally by the reference numeral 300. It is understood that the window 300 is generated by a computer comprising a display 301A, a central processing unit (CPU) 301B, a memory 301C and an input device 301D. The window 300 includes a frame 302 that bounds the window 300. Within the frame 302 are a title bar 304, a graphic pad area 306, control buttons 308–317, each associated with a component of a selected icon, an "OK" button 318, a "CANCEL" button 320 and a "HELP" button 322.

In operation, the user uses the window 300 in combination with a pointing device (not shown) to construct or customize an icon 324, using the control buttons 308–317 to select images, or objects, from sets of objects associated with each component of the icon 324. In the embodiment illustrated in FIG. 3, the icon 324 is an image of a human face and comprises a plurality of components that may be modified by a user, including hair, eyes, nose and mouth components 326a–326d, respectively. The color of the respective components, such as the hair color and skin color of the icon 324, may also be modified by the user, as will be described.

Figure 4:
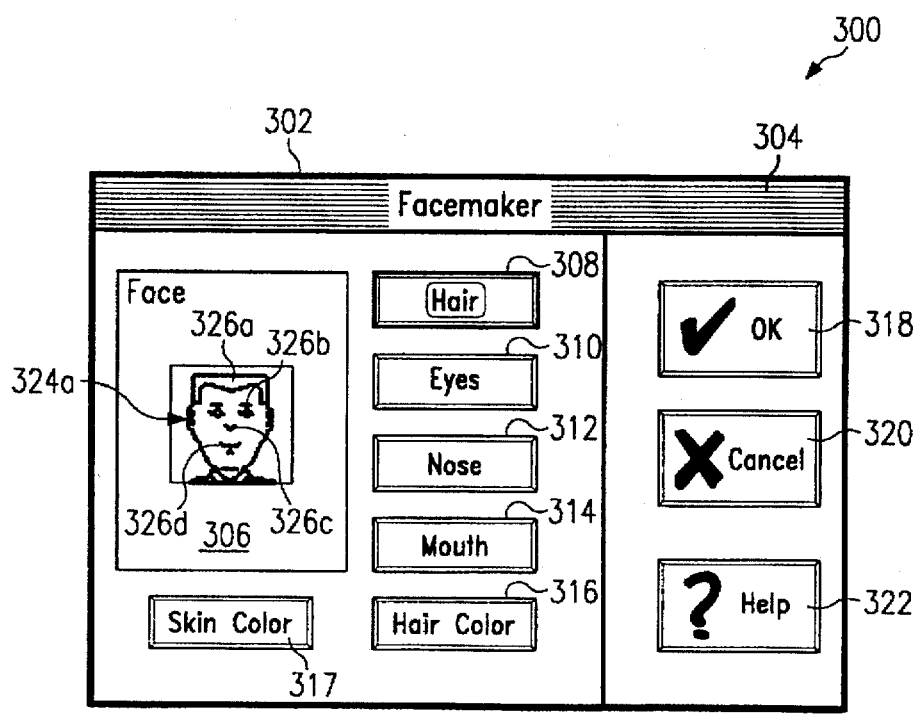
FIG. 4 is a pictorial view of the window of FIG. 3 after an icon component has been modified in accordance with the present invention.

To modify one of the components 326a–326d, the user selects the control button 308–314 corresponding to the component to be modified. For example, assuming the user wants to modify the hair component 326a of the icon 324, the user selects the control button 308, labeled "Hair." As a result, the icon 324 is "redrawn" as an icon 324A, as shown in FIG. 4. The icons 324 and 324A are identical except for the hair styles thereof. The user may continue to view alternative hair styles by selecting the button 308 until an acceptable hair style is displayed or until all of the alternatives have been displayed, at which point the hair styles are repeated. Similarly, the control buttons 310, 312 and 314, which are labeled "Eyes," "Nose," and "Lips," respectively, may be selected to change the appearance of the eyes, nose and mouth components 326b–326d of the icon 324.

Figure 5:
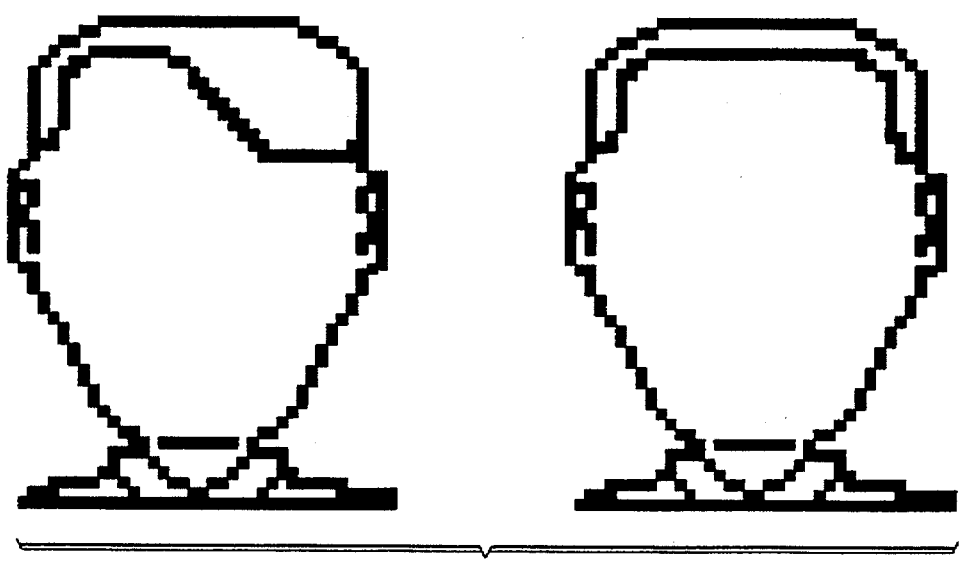
FIG. 5 is a pictorial view of a sample set of objects for representing a "hair" component of a particular icon.
Figure 6:
FIG. 6 is a pictorial view of a sample set of objects for representing an "eyes" component of a particular icon.
Figure 7:
FIG. 7 is a pictorial view of a sample set of objects for representing a "nose" component of a particular icon.
Figure 8:
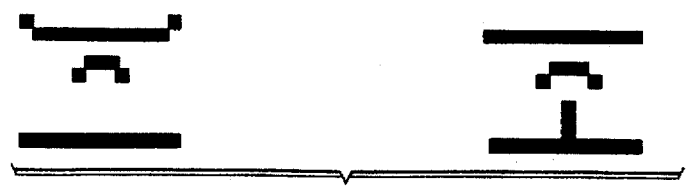
FIG. 8 is a pictorial view of a sample set of objects for representing a "lips" component of a particular icon.

As will be described in detail with reference to FIGS. 9–11, each of the components 326a–326d may be represented by an object selected from a set of objects associated with the particular component. Each object is stored as a separate file, and all files corresponding to a single component are combined into single indexed set to be referenced by the component. FIG. 5 depicts a sample set of objects that may be selected to represent the hair component 326a. FIG. 6 depicts a sample set of objects that may be selected to represent the eyes component 326b. FIG. 7 depicts a sample set of objects that may be selected to represent the nose component 326c. FIG. 8 depicts a sample set of objects that may be selected to represent the mouth component 326d.

With regard to hair and skin color of the icon 324, objects associated with a skin component of the icon 324 contain a "hot spot" for enabling the component to be "color-filled" with a color selected by the user using the button 317. Each object associated with the hair component 326a contains two such hot spots, each hot spot being associated with a portion of the component 326a to enable depiction of bald or balding hairstyles. To change the color of the hair component 326a, the user "scrolls" through the various hair color alternatives by selecting the button 316 until an appropriate color color-fills the the hair component 326a.

Once the user has selected appropriate objects for each component and is satisfied with the appearance of the icon 324, the user may save the icon for use with various other application programs by selecting the OK button 318. The saved icon is stored based on the identification of the selected objects, which define the appearance of the icon, so that a primitive merely references the object files of the selected objects.

The preferred embodiment of the invention is implemented using an object-oriented programing approach. In addition to the objects for representing the icon components, there are four additional objects of importance, including an object representing the icon 324, an object representing the graphic pad area 306, an object representing the window 300, and objects representing the control buttons 308–322. The first object, representing icon 324, is a data-only object that is a primitive of the operating system of the computer on which the system is implemented. In the preferred embodiment, the operating system is Microsoft Windows, although the system may be implemented using any number of different operating systems.

Figure 9:
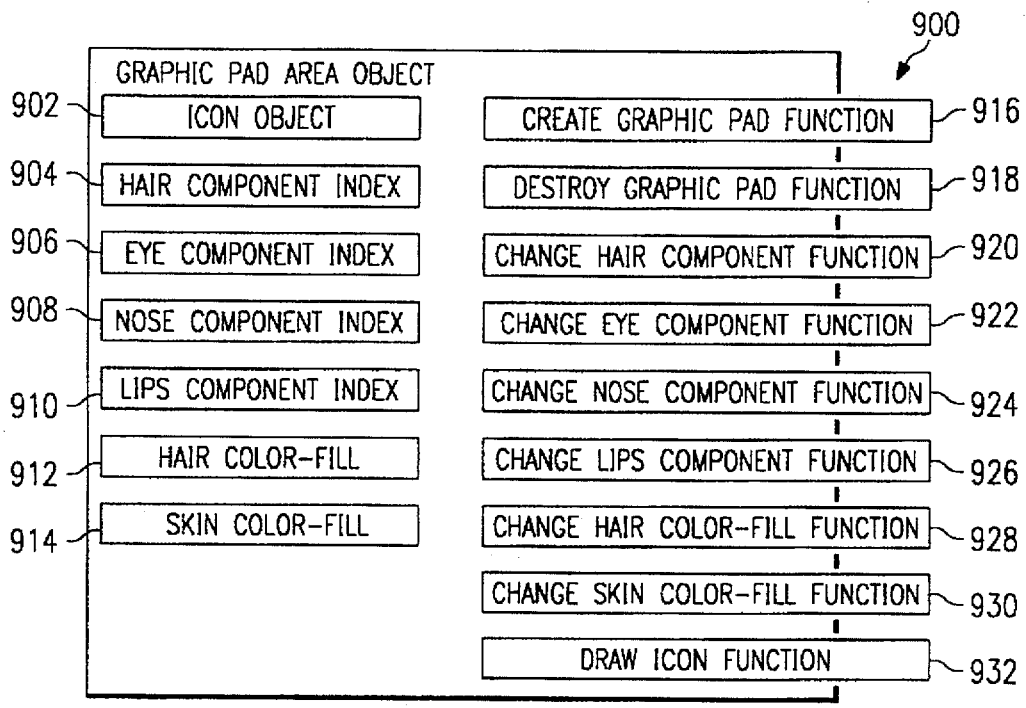
FIG. 9 is a block diagram of a graphic pad area object in which indices to the icon component objects of FIGS. 5–8 are stored.

FIG. 9 is a block diagram of an object 900 representing the graphic pad area 306. The graphic pad area object 900 contains seven relevant data elements, including an element 902 which contains a reference to the current icon, elements 904–910 which contain indices to the current hair, eyes, nose and lips objects, respectively, and elements 912–914 which contain references to the current hair color and skin color. The graphic pad area object 900 also contains nine relevant functions which include functions 916 and 918 for creating and destroying the graphic pad area, functions 920–926 for changing the hair, eye, nose and lip objects, functions 928 and 930 for changing the hair color and skin color, and a function 932 for drawing the icon 324 based on the current values of the elements 902–914.

Figure 10:
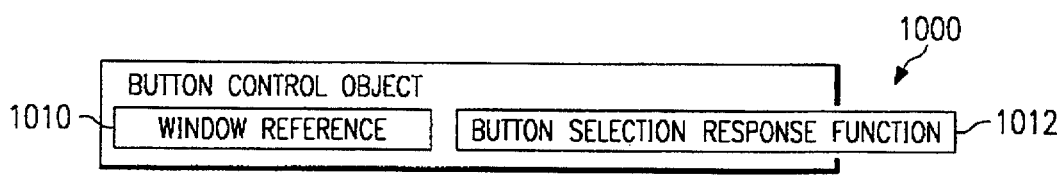
FIG. 10 is a block diagram of a control button object for responding to the selection of a corresponding control button.

FIG. 10 is a block diagram of an object 1000 representing one of the buttons 308–322, it being understood that each of the buttons 308–322 has associated therewith a button control object similar to the object 1000. The button control object 1000 contains one relevant data element 1002, which contains a reference to the window object (FIG. 11), and one relevant function 1004 for responding to user selection of the control button with which the object 1000 is associated.

Figure 11:
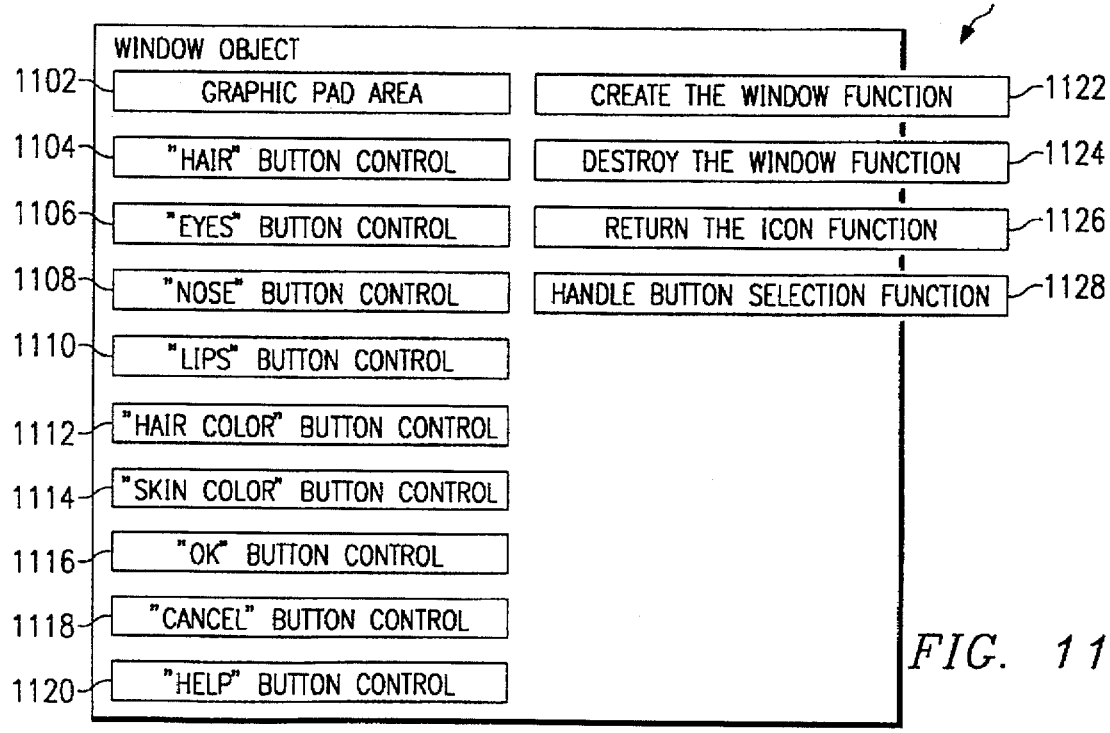
FIG. 11 is a block diagram of a window object of the window of FIG. 3.

FIG. 11 is a block diagram of an object 1100 associated with the window 300. The window object 1100 contains ten relevant data elements, including an element 1102 which contains a reference to the graphic pad area object 900 (FIG. 9), elements 1104–1110 which contain references to hair, eye, nose and lips button control objects, such as the object 1000 (FIG. 10), elements 1112 and 1114 which contain references to hair and skin color button control objects, and elements 1116–1120 which contain references to the OK, CANCEL and HELP button control objects. The window object 1100 also contains four relevant functions, including a create window function 1122, a destroy window function 1124, a return icon function 1126 and a handle button selection function 1128.

Figure 12:
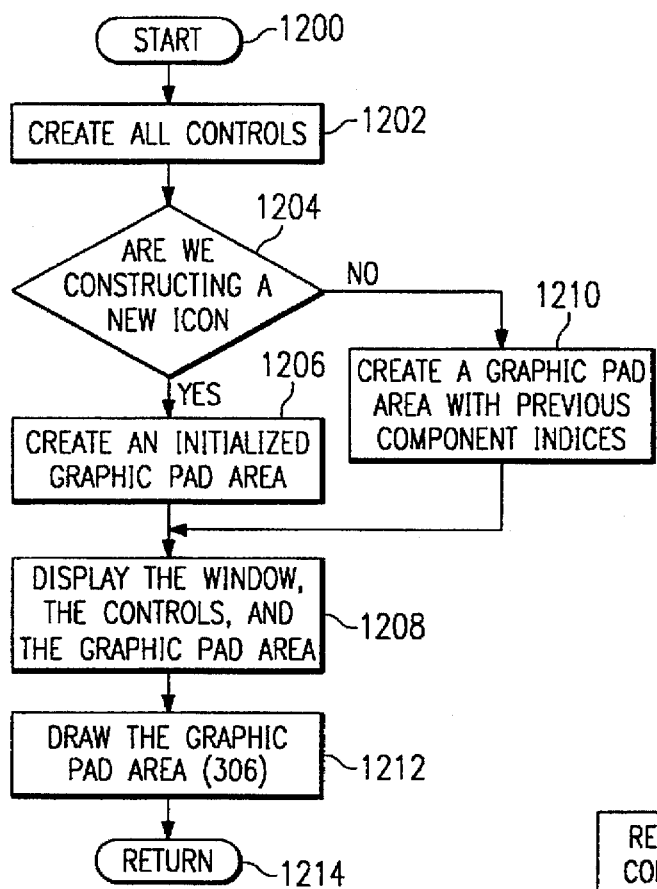
FIG. 12 is a flowchart of a "create window" routine for implementing the system of the present invention
Figure 14:
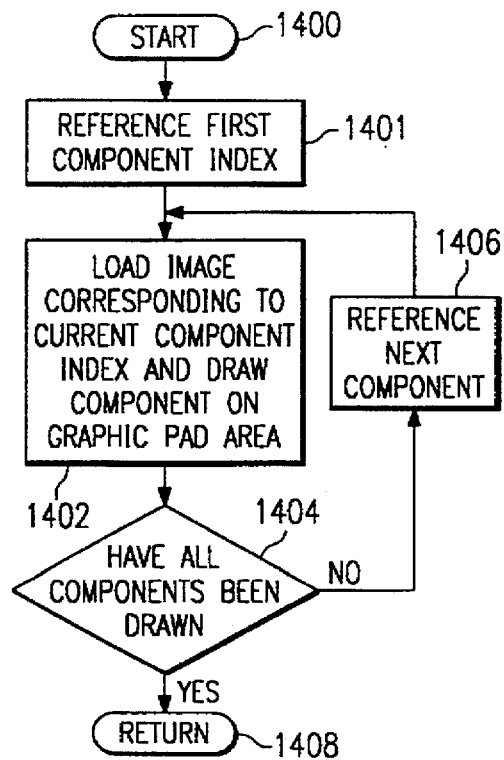
FIG. 14 is a flowchart of a "draw pad" routine for implementing the system of the present invention.
Figure 13:
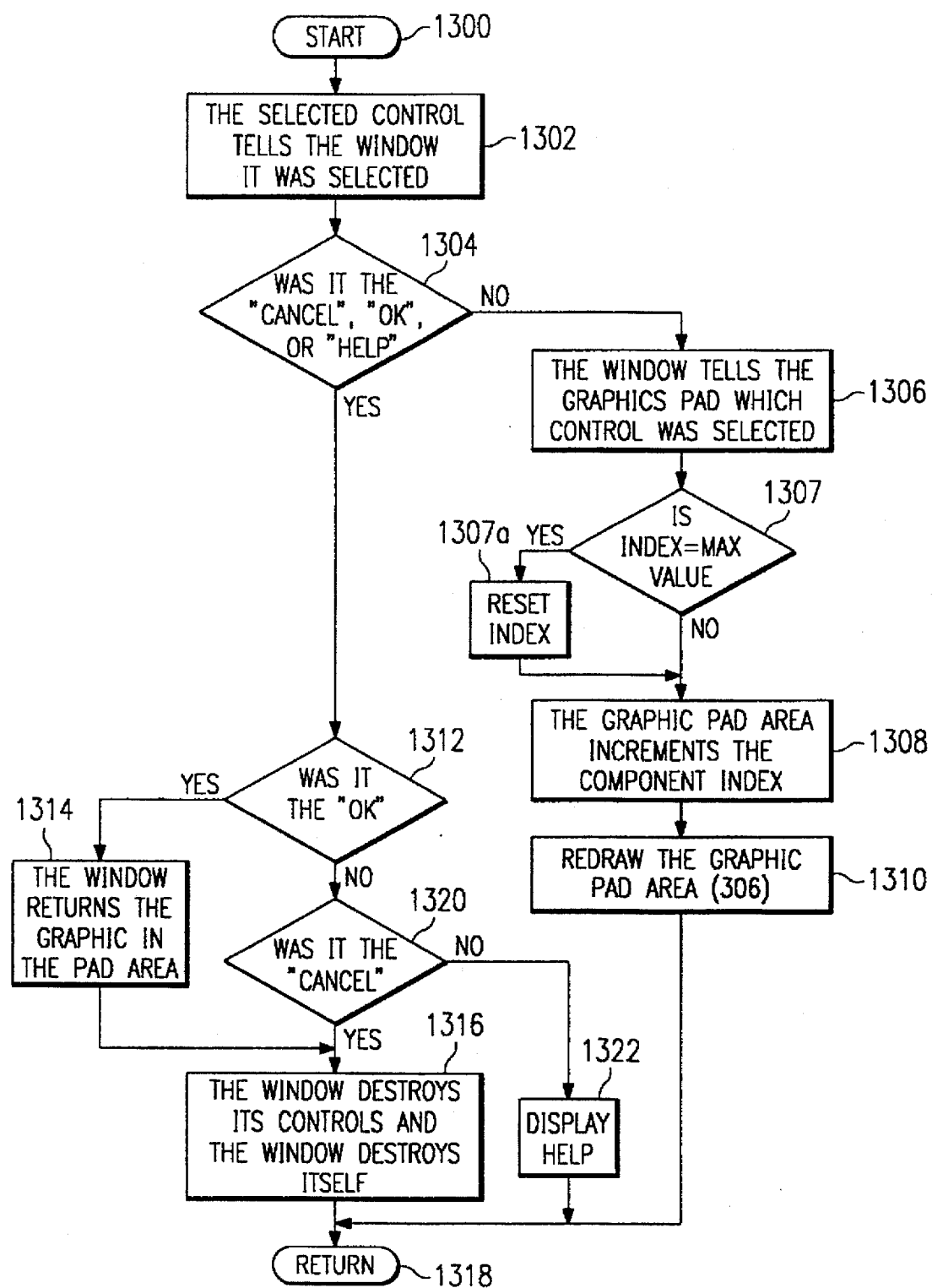
FIG. 13 is a flowchart of a "process selection" routine for implementing the system of the present invention.

FIGS. 12–14 are flowcharts of the logic used to implement system of the present invention. It is understood that the logic is stored as program instructions in the memory 301C, which instructions are executed by the CPU 301B responsive to user commands entered from the input device 301D.

FIG. 12 is a flowchart of a "create window" routine for creating the window 300 and the graphic pad area 306 using the window object 1100 (FIG. 11) and the graphic pad area object 1000 (FIG. 10). Execution begins at step 1200 when the "create window" routine is called by the computer's operating system or by an application program executing on the computer (hereinafter, the "calling program"). At step 1202, the control buttons 308–322 are created. In step 1204, a determination is made whether a new icon is to be constructed. If a new icon is to be constructed, execution proceeds to step 1206, in which the component indices 904–914 are set to default values corresponding to an initial state of the icon and execution proceeds to step 1208. If in step 1204, an existing icon, such as the icon 324, is to be customized or modified, execution proceeds to step 1210. In step 1210, the component indices 904–914 are set to values which index the objects corresponding to the stored state of the icon 324 and execution proceeds to step 1208.

In step 1208, the window 300, graphic pad area 306 and nine buttons 308–322 are displayed to the user, as illustrated in FIGS. 3 and 4. In step 1212, the icon 324, as defined by the objects indexed by the indices 902–914, is drawn in the graphic pad area 306 using a "draw pad" routine (FIG. 14). In step 1224, execution returns to the calling program.

FIG. 13 is a flowchart of a routine for processing the selection of one of the control buttons 308–322. Execution begins at step 1300 when a user selects one of the buttons 308–322. In step 1302, the object 1000 of the selected control button communicates its identity to the window object 1100. In the preferred embodiment, this step 1302 is implemented by the operating system sending a message to the object 1100; however, other embodiments may accomplish step 1302 by directly invoking an operating system function. In step 1304, a determination is made whether the selected button is one of the CANCEL, HELP, or OK buttons 318–322. If the selected button is not one of the CANCEL, HELP or OK buttons 318–322, execution proceeds to step 1306.

In step 1306, the window object 1100 communicates the identity of the selected control button 308–317 to the graphic pad area object 900 by calling a function in the graphic pad area object 900 that corresponds to the selected button 308–317. In step 1307, the component index element 904, 906, 908, 910, 912, or 914 corresponding to the selected button 308, 310, 312, 314, 316, or 317, respectively, is checked to determine whether the index has reached a maximum value, indicating that the last object in the associated object set has been displayed. If so, execution proceeds to step 1307a in which the index is reinitialized and execution proceeds to step 1308. If in step 1307 the index has not reached a maximum value, execution proceeds directly to step 1308.

In step 1308, the component index element 904, 906, 908, 910, 912, or 914 corresponding to the selected button 308, 310, 312, 314, 316, or 317, respectively, is incremented to index the next object in the associated object set. For example, if the user has selected the button 308, corresponding to the hair component 326a, the index contained within the element 904 will be incremented to index the next object of the set of objects representing the hair component 326a (FIG. 5). In step 1310, the "draw pad" routine (FIG. 14) is used to redraw the graphic pad area 306 and the icon 324 using the objects indexed by the updated indices contained within the elements 903–914 of the object 900. In the case of the above example, the icon 324 would be redrawn as the icon 324A.

If in step 1304 the selected button is one of the OK, CANCEL or HELP buttons 318–322, execution proceeds to step 1312. In step 1312, a determination is made whether the selected button is the OK button 318. If so, execution proceeds to step 1314, in which the icon 324 is returned to the calling program using the return icon function 1126 of the window object 1100. In the preferred embodiment, the icon 324 as modified is stored in the memory 301c as a new icon. In step 1316, the buttons 308–322 and the window 300 are destroyed using the destroy window function 1124 of the window object 110. Execution then proceeds to step 1318, in which control returns to the calling program.

If in step 1312, it is determined that the selected button is not the OK button 318, execution proceeds to step 1320, in which a determination is made whether the selected button is the CANCEL button 320. If so, execution proceeds to step 1316, in which the buttons 308–322 and the window 300 are destroyed and control is returned to the calling program in step 1318. If in step 1320 it is determined that the selected button is not the CANCEL button 320, indicating that the selected button must be the HELP button 322, execution proceeds to step 1318, in which appropriate help information is displayed in the window 300 before control is returned to the calling program in step 1318.

FIG. 14 is a flowchart of a "draw pad" routine of the present invention. Execution begins in step 1400 when the draw pad routine is called by the "create window" routine (FIG. 12). In step 1401, the first component index, for example, the hair component index contained in the element 902, is referenced. In step 1402, the image of the object indexed by the referenced index is drawn on the graphic pad area in a location specific to that component. In step 1404, a determination is made whether all of the components 326a–326b have been drawn. If not, execution proceeds to step 1406, in which the next component index, for example, the eye component index contained in the element 906, is referenced and execution returns to step 1402. Otherwise, execution proceeds to step 1408 and control returns to the calling program.

In the manner described, a user can easily create or modify icons for use in a GUI by manipulating sets of objects corresponding to individual components of an icon, wherein the appearance of each component, and hence the icon, is dictated by the selected object. As described, the objects are manipulated and selected using control buttons associated with the individual components and with certain functions for selecting and canceling selection of components. Objects thus selected are instantaneously visible on the graphic area pad in the correct location and scale with respect to the particular component, so that no artistic skill or design expertise is needed to modify or create an icon. Accordingly, a user is given the opportunity to determine whether to accept the icon as currently depicted or continue to view alternative selections.

While many useful applications of the present invention are envisioned, in a particular application, icons may be constructed or customized to resemble particular users in a multiple-user computer environment. Such icons may then be used to identify which user is currently signed on to the computer system, as well as to identify which user is attempting to sign on. Such a system would constitute a vast improvement over current text-based identification systems, in which the name of a current user is the sole means for identifying the user.

Figure 15A:
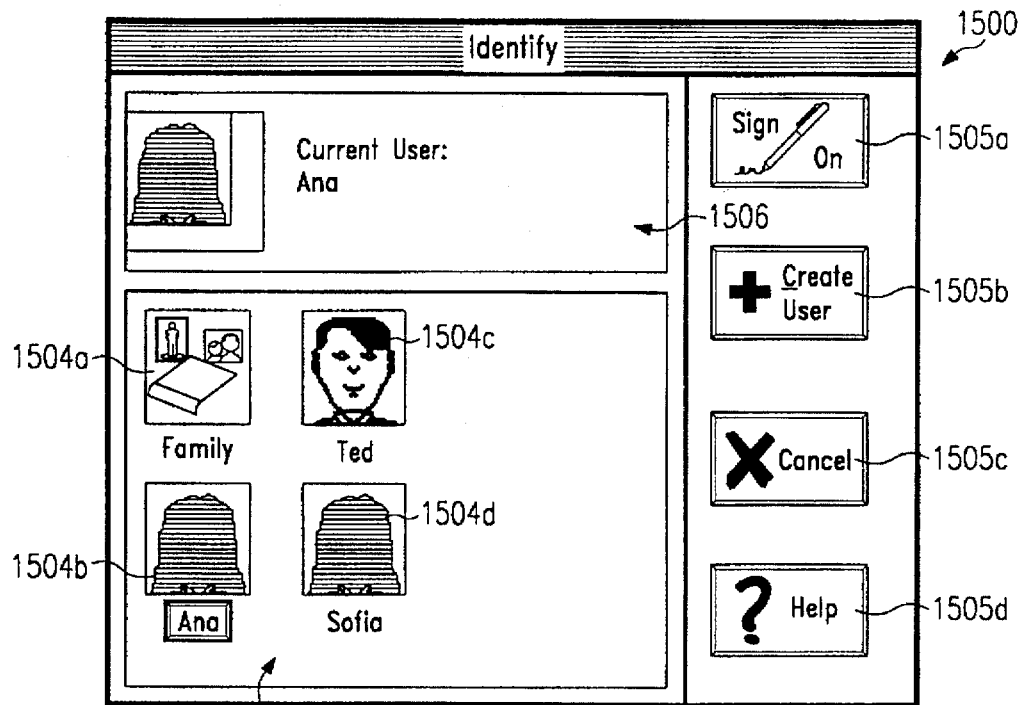
FIGS. 15A–15C are pictorial views of dialog boxes for implementing a particular application of the present invention.
Figure 15B:
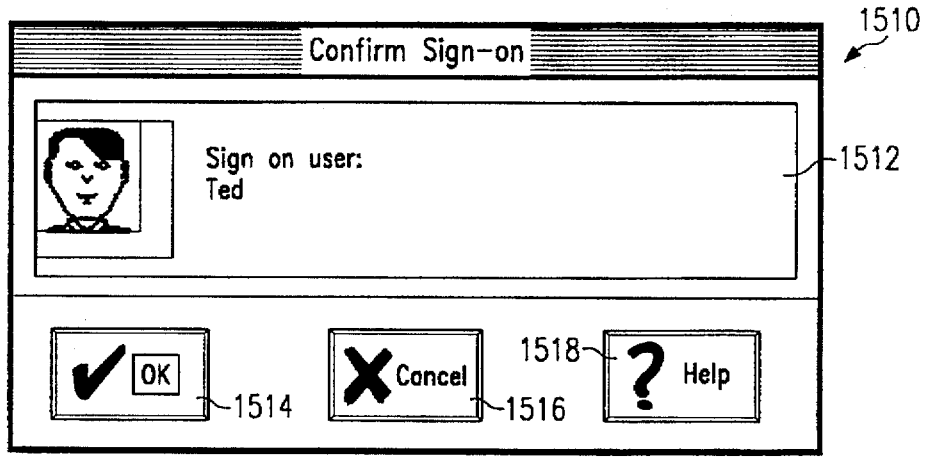
Figure 15C:
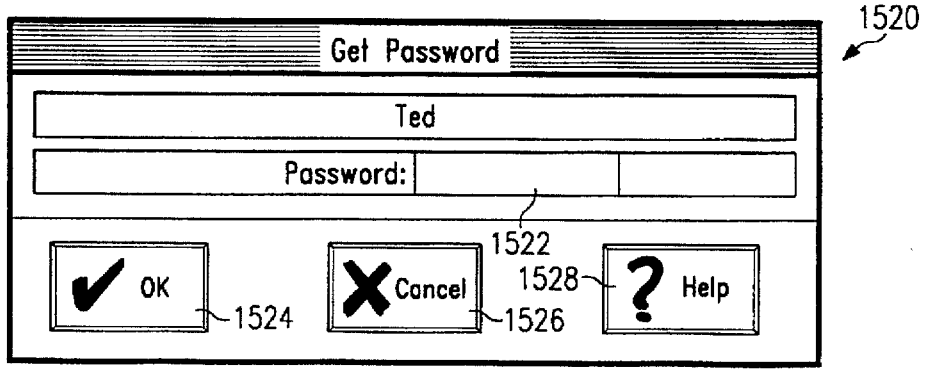

For example, referring to FIGS. 15A–15C, in a particular embodiment, a dialog box 1500 (FIG. 15A) entitled "Identify" appears on the computer screen in response to a user's selecting a control button or a pull-down menu function from a main window of a GUI (not shown) to initiate a sign on procedure. The box 1500 comprises a window 1502 containing a plurality of icons 1504a–1504d, each of which is associated with a different user of the computer system. In addition, the box 1500 contains four control buttons, including a SIGN ON button 1505a, a CREATE USER button 1505b, a CANCEL button 1505c, and a HELP button 1505d. The name of the user may also appear in the box 1500 along with the icon, as shown in FIG. 15A. The current user is identified by an icon corresponding to one of the icons 1504a–1504d and appearing in a current user field 1506 of the box 1500. After the user has selected one of the icons 1504a–1504d, the user may sign on by selecting the SIGN ON button 1505a, cancel the selection by selecting the CANCEL button 1505c or receive help information by selecting the HELP button 1505d. Alternatively, rather than selecting one of the icons 1504a–1504d, the user may create a new icon by selecting the CREATE USER button 1505b, in which case the window 300 would appear to facilitate the creation or modification of an appropriate icon.

If the SIGN ON button 1505a is selected, a dialog box 1510 (FIG. 15B) entitled "Confirm Sign-on" will appear on the screen overlaying the box 1500. The box 1510 contains an OK button 1512, a CANCEL button 1514, a HELP button 1516 and a sign on user field 1518, in which the icon selected from the box 1500 appears. In this case, the icon 1504c, corresponding to a user "TED," was selected. To confirm sign-on of the user identified in the field 1518 and to sign off the user identified in the field 1506, the user selects the OK button 1512. The user also has the option of returning to the box 1500 without signing on, for example, if the user has mistakenly selected another user's icon, by selecting the CANCEL button 1514, or of viewing help information by selecting the HELP button 1516. It is understood that access to the computer is inhibited, and the sign in process is not complete, until a correct password is entered.

If the computer's sign-on procedures require that a password be entered before a user is granted access to the computer, a dialog box 1520 (FIG. 15C) entitled "Get Password" will appear on the screen overlaying the boxes 1500, 1510. At this point, the user is required to type his or her password in a password field 1522, after which the user may select an OK button 1524 to enter the password, the CANCEL button 1526 to return to the screen 1510, or the HELP button 1528 to view help information.

It is understood that the present invention can take many forms and embodiments. The embodiments shown herein are intended to illustrate rather than to limit the invention, it being appreciated that variations may be made without departing from the spirit or the scope of the invention. For example, the icon 324 may comprise any number of different types of icons. Furthermore, the system may be implemented on computers having operating systems other than Microsoft Windows. In addition, the sign-on procedure illustrated in FIG. 15 may be accomplished using images derived from actual photographs of the various users, which are bit-mapped in the memory of the computer, rather than the icons 1504a–1504d.

Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. A method of operating a computer system having a display screen, the method comprising the computer implemented steps of:
    displaying an icon comprising at least two icon components on said display screen, wherein at least one of said at least two icon components is a user-modifiable non-text icon component;
    for each said user-modifiable non-text icon component, selecting an object from a set of objects for representing said user modifiable non-text icon component by selecting a graphical display element associated with said user-modifiable non-text icon component, wherein only one object from said set of objects is displayed on said display screen during said selecting; and
    for each said user-modifiable non-text icon components, responsive to said selecting step, modifying said icon by overlaying said selected object on said icon, wherein said modifying occurs automatically without additional input from a user following said selecting;
    wherein said modifying each said user-modifiable non-text icon component does not effect a modification of any other ones of said at least two icon components.

2. The method of claim 1 wherein said step of displaying further comprises overlaying a first object on said icon to represent said user-modifiable non-text icon component.

3. The method of claim 2 further comprising a computer implemented step of, for each said user-modifiable non-text icon component, removing said first object from said icon immediately prior to said overlaying of said selected object.

4. The method of claim 1 wherein said overlaying is performed in accordance with rules associated with said user-modified non-text icon component.

5. The method of claim 4 wherein said rules define a position of said overlaying of said selected object on said icon and a size of said selected object relative to said icon.

6. The method of claim 1 further comprising a step of, for each said user-modifiable non-text icon component, a computer implemented step of removing a currently overlaid object from said icon immediately prior to said overlaying of said selected object.

7. The method of claim 1 further comprising a step of storing said modified icon in a memory of said computer system.

8. The method of claim 1 wherein said step of selecting is performed by using a pointing device to click on said graphical display element associated with said user-modifiable non-text icon component.

9. The method of claim 1 wherein said icon comprises a human likeness and said user-modifiable non-text icon component comprises at least one of a hair component, an eyes component, a lips component and a nose component.

10. The method of claim 1 further comprising steps of;
    selecting a color to be associated with said user-modifiable non-text icon component; and
    color-filling said user-modifiable non-text icon component with said associated color.

11. The method of claim 1 wherein said icon comprises a user identification icon associated with a user of said computer, the method further comprising computer implemented steps of:
    displaying said user identification icon on said display screen;
    responsive to a selection of said user identification icon, logging said associated user on to said computer system.

12. The method of claim 11 wherein said logging on step further comprises computer implemented steps of:
    prompting a user to enter a password associated with said user identification icon;
    determining whether said entered password is valid; and
    preventing said logging on if said entered password is not valid.

13. The method of claim 11 further comprising the computer implemented step of displaying said user identification icon on said screen until said associated user has been logged off of said computer.

14. The method of claim 11 wherein said selection is performed using a pointing device of said computer.

15. The method of claim 1 wherein said icon comprises a human likeness.

16. A method of operating a computer having a display screen, the method comprising the steps of:
    displaying an icon comprising at least two user-modifiable non-text components on said display screen, wherein each of said user-modifiable non-text components is represented by a first object of a sequentially indexed set of objects for representing said user-modifiable non-text component, wherein said first object is overlaid on said icon;
    for each of said user-modifiable non-text components, selecting a first graphical display element to select a different object of said sequentially indexed set of objects to be overlaid on said icon, wherein only one object of said sequentially index set of objects is displayed on said display screen at any given time; and responsive to said selecting of said first graphical display element, modifying said icon by replacing said first object currently overlaid on said icon with a next object of a sequentially indexed set of objects;

wherein said modifying occurs automatically and without additional input by a user following said selecting.

17. The method of claim 16 further comprising a step of storing said modified icon as a new icon in a memory of said computer responsive to selection of a second graphical display element.

18. The method of claim 16 wherein said selection is performed using a pointing device of said computer.

19. The method of claim 16 further comprising the computer implemented steps of, for each of said user-modifiable non-text icon components:

indexing said first object prior to said displaying; and responsive to said selection of said first window element, incrementing said index to index a next object in said sequentially indexed set of objects.

20. The method of claim 16 wherein said icon comprises a human likeness.

21. In a computer having a display screen, a system for constructing or modifying an icon having at least two user-modifiable non-text components, the system comprising:

for each of said at least two user-modifiable non-text components, a plurality of objects for representing said user-modifiable non-text component, wherein no more than one of said plurality of objects are displayed on said display screen at a given time; and for each of said at least two user-modifiable non-text components, at least one first graphical display element associated with said user-modifiable non-text component, wherein each time said at least one graphical display element is selected by a user, a different one of said plurality of objects is selected;

wherein for each of said at least two user-modifiable non-text components, said selected object is automatically overlaid on said icon in the proper location without further input from said user following said selecting and defines the appearance of said user-modifiable non-text component.

22. The system of claim 21 further comprising a graphic area pad in which said icon is displayed.

23. The system of claim 21 further comprising:

for each of said at least two user-modifiable non-text components, means for overlaying said selected object on said user-modifiable non-text component in accordance with rules associated with said user-modifiable non-text component, which rules define the position of said selected object relative to said icon and the size of said object.

24. The system of claim 21 wherein for each of said at least two user-modifiable non-text components, said plurality of objects are sequentially indexed into a set of objects associated with said user-modifiable non-text component.

25. The system of claim 24 further comprising:

for each of said at least two user-modifiable non-text components, means for indexing said selected object.

26. The system of claim 25 further comprising:

for each of said at least two user-modifiable non-text components, means for incrementing said indexing means upon actuation of said at least one first graphic display element.

27. The system of claim 21 further comprising:

a second graphic display element, wherein selection of said second graphic display element results in said modified icon being stored in a memory of said computer.

28. The system of claim 21 wherein said icon comprises a human likeness.

* * * * *